United States Patent [19]
Henriksson

[11] Patent Number: 5,279,180
[45] Date of Patent: Jan. 18, 1994

[54] ACTUATING DEVICE

[75] Inventor: Kjell Henriksson, Bredaryd, Sweden

[73] Assignee: Ergotek I Smaland AB, Sweden

[21] Appl. No.: 31,594

[22] Filed: Mar. 15, 1993

[30] Foreign Application Priority Data

Mar. 24, 1992 [SE] Sweden ............... 9200906

[51] Int. Cl.⁵ .................. G05G 11/00; G05G 5/06
[52] U.S. Cl. ...................... 74/502.2; 74/489; 74/526
[58] Field of Search .............. 74/488, 489, 516, 518, 74/502.2, 526

[56] References Cited

U.S. PATENT DOCUMENTS

| | | | |
|---|---|---|---|
| 4,850,241 | 7/1989 | Buckley et al. | 74/502.2 |
| 4,899,610 | 2/1990 | Bourret | 74/489 |
| 4,916,967 | 4/1990 | Nakamura | 74/502.2 |
| 4,945,785 | 8/1990 | Romano | 74/526 X |
| 4,977,792 | 12/1990 | Nagano | 74/502.2 |
| 5,078,023 | 1/1992 | Scarborough | 74/489 X |

FOREIGN PATENT DOCUMENTS

| | | | |
|---|---|---|---|
| 895963 | 2/1945 | France | 74/489 |
| 1061867 | 4/1954 | France | 74/489 |
| 1124891 | 10/1956 | France | 74/489 |
| 2620407 | 3/1989 | France | 74/489 |

Primary Examiner—Vinh T. Luong
Attorney, Agent, or Firm—Zarley, McKee, Thomte, Voorhees & Sease

[57] ABSTRACT

An apparatus for imparting a movement to an actuation of an object, such as a brake, and comprising a bracket (2) with an operating device (4), preferably in the form of a handle (24), a stirrup, an arm or a lever which is disposed in connection with the object via a connecting device (5), the connecting device (5) including an element (6) which is rotatably disposed in the bracket (2) about a first pivot (9), a shaft or the like, and a coupling device (7) which is anchored with the said element (6) in a portion (8) a distance from the said first pivot (9), and that the operating device (4) is secured with the said element (6).

4 Claims, 5 Drawing Sheets

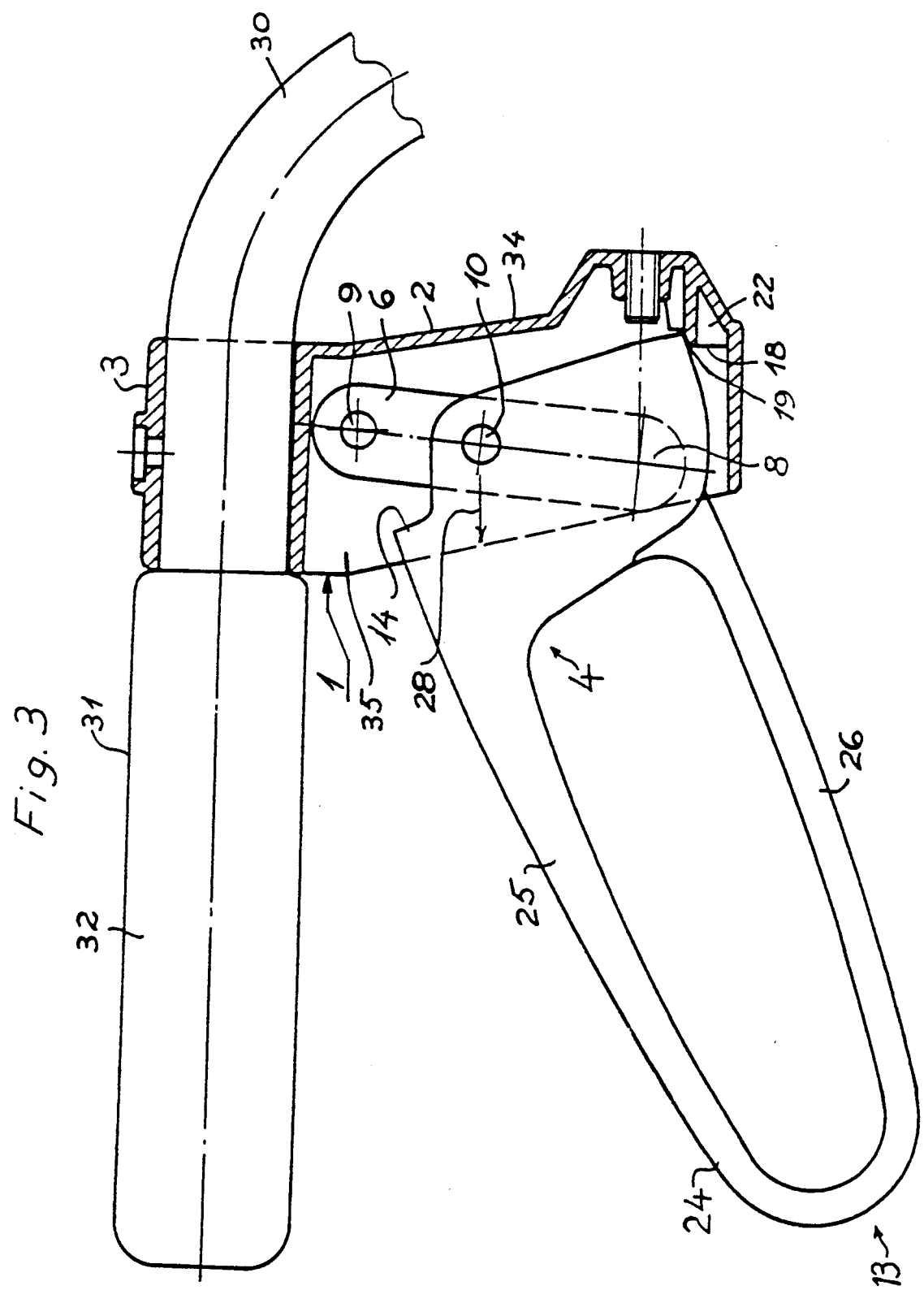

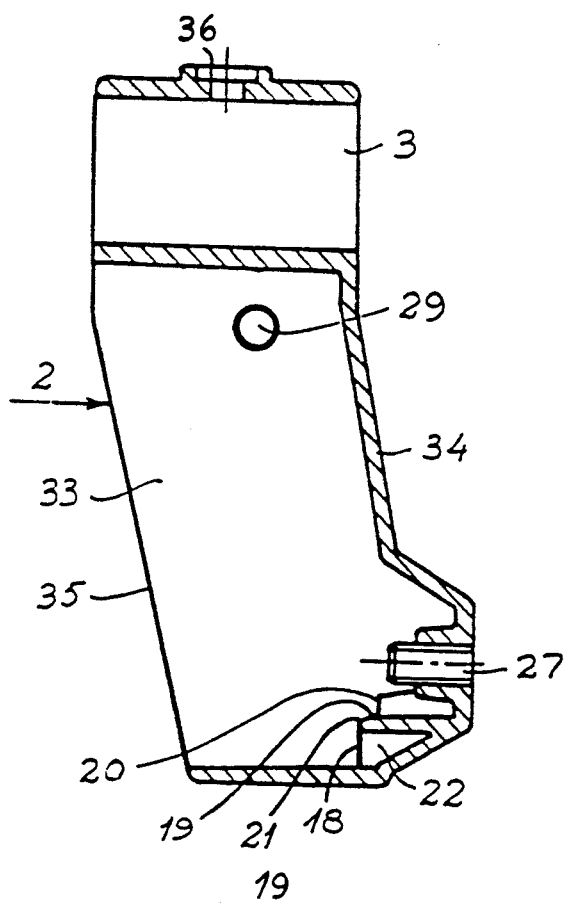
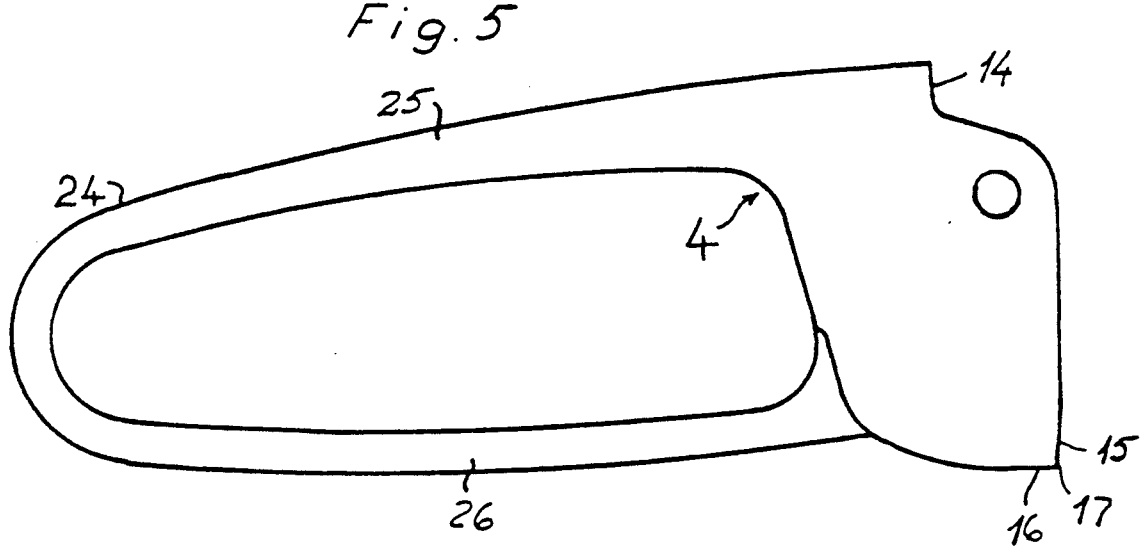

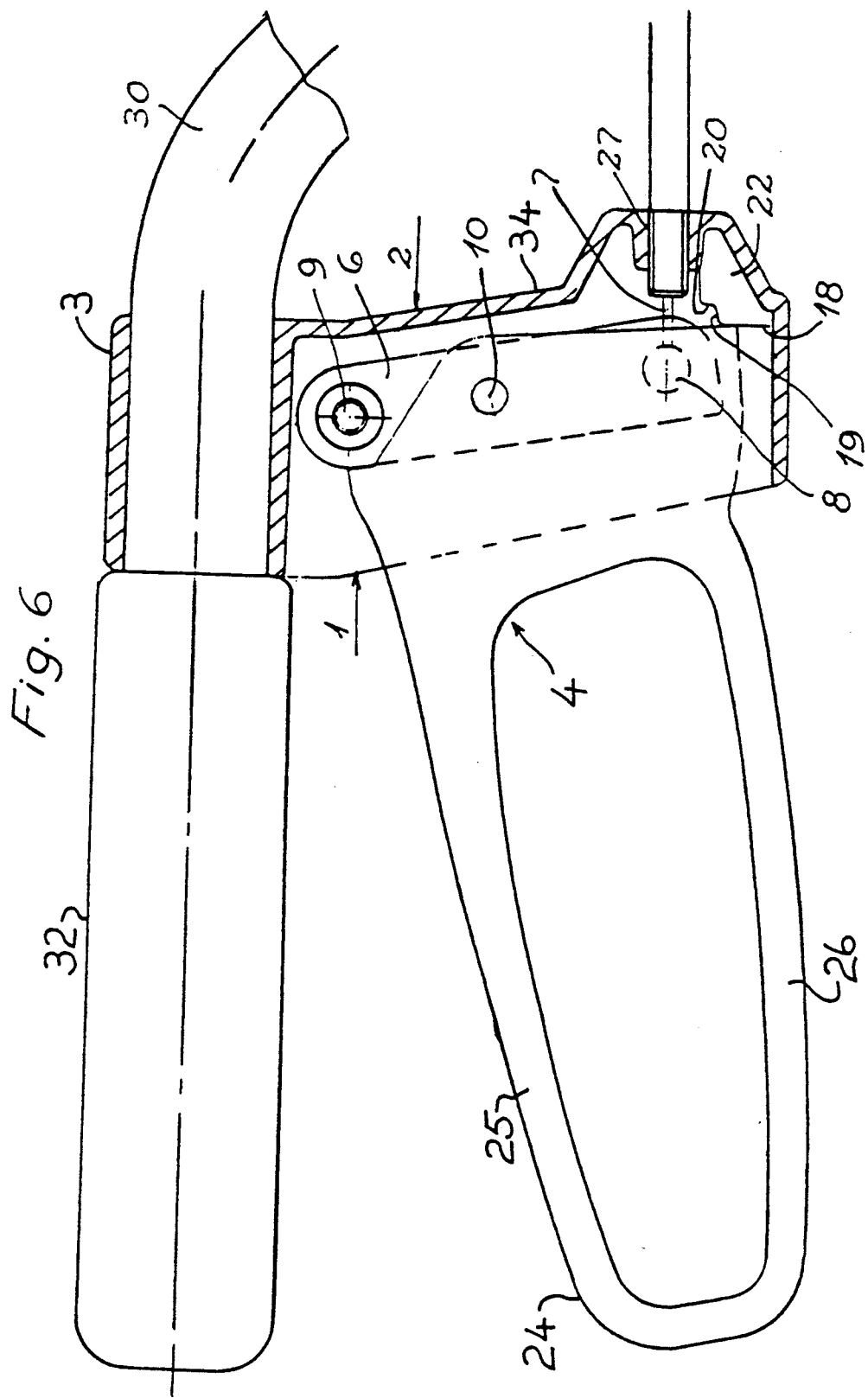

ACTUATING DEVICE

BACKGROUND

The present invention relates to an apparatus for imparting a movement to and actuating an object and comprises a bracket with an operating device, preferably in the form of a handle, stirrup, arm or lever and which is disposed in connection with the object via connection devices. The object may, for example, consist of a brake for a wheel on a vehicle, implement or other wheeled apparatus.

FIELD OF THE INVENTION

Such an actuating apparatus or regulator may be employed within a multiplicity of different fields, for example, for triggering or operating an apparatus, an object such as the exemplified brake, a contactor or for tightening a line or other elongate object. On occasions, such apparatuses are provided for being able to actuate an object or the like to assume two different operative positions.

There is a need for such an apparatus which is simple to handle by one and all and also by such people as suffer from restricted powers of movement, in particular in the hands and/or suffer from reduced strength in the hands. Furthermore, there is a need in such apparatuses to be able to cause the apparatus to assume a position of rest in an operative position, i.e. in a position in which the apparatus causes a working moment to be executed, and in which actuation must thus be maintained without handling of the apparatus being necessary. Another desirable need in the art is to be able to maintain, with reduced handling movement, a long or necessary stroke length for obtaining the desired effect. It should be possible to move an apparatus of the type in question to a position for actuating an object to assume an operative position and maintain the position without the apparatus needing to be actuated before the above-mentioned operative position is to be triggered. A further need is for such an apparatus, where applicable, to be capable of being operated simply with non-precision motoricity in the movements of the hand or fingers.

In, for example, a handbrake, the brake regulator must be pulled on during the entire time when braking effect is to be maintained. Such a design of a brake or an operating device therefor is sufficient in many cases. In other cases, it would be an advantage if a braking effect could be maintained without the need for a brake regulator to be operated during the time when it is desired to maintain the braking effect. This is particularly desirable in such brakes in which, where applicable, braking effect is to be maintained during a relatively long period of time and are moreover mounted in, for example, vehicles or implements which are to be used by people suffering from partial handicap or with reduced strength, in particular in the hands. Rolling walkers or walking frames are examples of such equipment which, moreover, are employed by people suffering from some form of movement handicap. The user of a rolling walker often needs to brake the rolling walker while walking, which is effected using an instantaneously operating brake. In lengthy stoppages when the user needs support of the rolling walker or when the user uses the rolling walker to sit on when taking a rest, it would be desirable if the apparatus could be realized for achieving a parking brake position, i.e. that the braking effect is maintained without the user needing to handle the apparatus, its operating device or a brake regulator during that time when the braking position is to be maintained Such a parking brake position can also be utilized while walking, when braking needs to be effected during a relatively lengthy time, for example when negotiating a descent. In handbrakes with brake regulators for manual activation, that hand movement which must be executed is relatively long for achieving the necessary stroke length for satisfactory application of the brake. Furthermore, an unnecessarily large force is also required for achieving a satisfactory braking effect.

SUMMARY OF THE INVENTION

In an apparatus according to the present invention, the set requirements are satisfied at the same time as the drawbacks inherent in prior art apparatuses are obviated. Thus, the apparatus is easy to operate, requires less movement capability and force on the part of the person operating the apparatus for achieving the intended effect and handling of the apparatus for actuating the object or the brake can be effected employing only non-precision motoricity. The apparatus is further designed to be able to assume at least one position in which the apparatus actuates the object to assume an operative position, and retains the object during that time in the operative position. In the said position of the apparatus, the apparatus will remain in a stable position, the rest position, or in an assumed locked position, i.e. the apparatus remains in that position until such time as a new operation, actuation or command is made. Moreover, the apparatus is designed in such a manner that a smaller or shorter operative movement need be carried out for achieving the necessary stroke length for imparting the movement or actuation to the object which is to be actuated. Furthermore, the apparatus can be designed with simple means to be adaptable according to those individual user's needs, which thus entails an individual adaptation or increased adaptation in individual cases. The apparatus moreover displays such a design that it can be manufactured in a simple manner and be correctly dimensioned, which achieves improved dependability as regards function and against wear and tear. An apparatus according to the present invention is, in this instance, characterized in that the connecting device includes an element which is rotatably disposed in the bracket about a first pivot, shaft or the like and which displays a connecting portion for a coupling device which is disposed in spaced apart relationship from the above-mentioned first pivot, and that the operating device is disposed in the apparatus in said element.

According to one embodiment of the apparatus according to the invention, the operating device is disposed in the above-mentioned element between the first pivot and the connecting portion.

According to a second embodiment of the apparatus according to the invention, the operating device is rotatably disposed in the above-mentioned element in a second pivot, shaft or the like and displays at least one first and one second abutment.

According to yet a further embodiment of the apparatus according to the invention, the bracket displays a first abutment surface for the operating device, which abutment surface displays a defining edge against a second abutment surface for the operating device.

In still a further embodiment of the apparatus according to the invention, the second pivot or shaft is anchored in the above-mentioned element and, together with the element, is disposed rotatably about the above-mentioned first pivot, and the operating device is rotatably disposed either about the first pivot or shaft and, in such instance, together with the element for assuming a second position, or about the second pivot or shaft for assuming a third position.

According yet a further embodiment of the apparatus according to the invention, the apparatus is intended to be disposed in a first position or a rest position in which the object is intended to be in a first position and disposed, on handling or actuation, to be capable of assuming or being moved to a second position in which the object is brought to a second position or operative position, and further disposed, on handling or actuation, to be capable of assuming or being moved to a third position in which the object is also brought to the above-mentioned second position or operative position, in which, on assumption of the said second position, the operating device and said element are disposed to rotate about said first pivot and, on assuming said third position, the operating device is disposed to rotate about said second pivot, said element and said second pivot being disposed to rotate about said first pivot.

In still a further embodiment of the apparatus according to the invention, the above-mentioned abutment surfaces and defining edge of the bracket are disposed on a body which is arranged to be disposable in the bracket and thereby is arranged to be replaceable by one or more other corresponding bodies with abutment surface, abutment surfaces and/or defining edge, of a different extent, angle, positioning or the like and/or a different dimension.

DESCRIPTION OF THE DRAWINGS

Further characterizing features of and advantages inherent in the apparatus according to the present invention will be apparent from the following description of one embodiment of the apparatus, reference being made at the same tine to the accompanying schematic Drawings in which FIG. 1 is a side elevation, partly in section, of an apparatus according to the invention, according to one embodiment, and in a first position or released position of the object, the apparatus being disposed on a vehicle, implement or the like and, in accordance with the illustrated example in connection to a handle, grip or the like displayed on the vehicle, implement or the like.

FIG. 2 is a side elevation, partly in section, of the apparatus of FIG. 1 in a second position or an instantaneous brake position for the object, the apparatus being disposed on the same vehicle, implement or the like.

FIG. 3 is a side elevation, partly in section, of the apparatus of FIG. 1 in a third position or a braking position for the object, but in this instance a locked braking position or so-called parking position.

FIG. 4 is a section through a part of the apparatus or a bracket portion in the apparatus seen from the side.

FIG. 5 is a side elevation of a part of an apparatus or an operating portion in the apparatus which, in the form of a handle, stirrup, arm, lever or the like, is to be operated manually, and FIG. 6 is a side elevation, partly in section, of an apparatus according to FIG. 1, but in accordance with a slightly different embodiment.

DESCRIPTION OF THE PREFERRED EMBODIMENT

Figure 1:
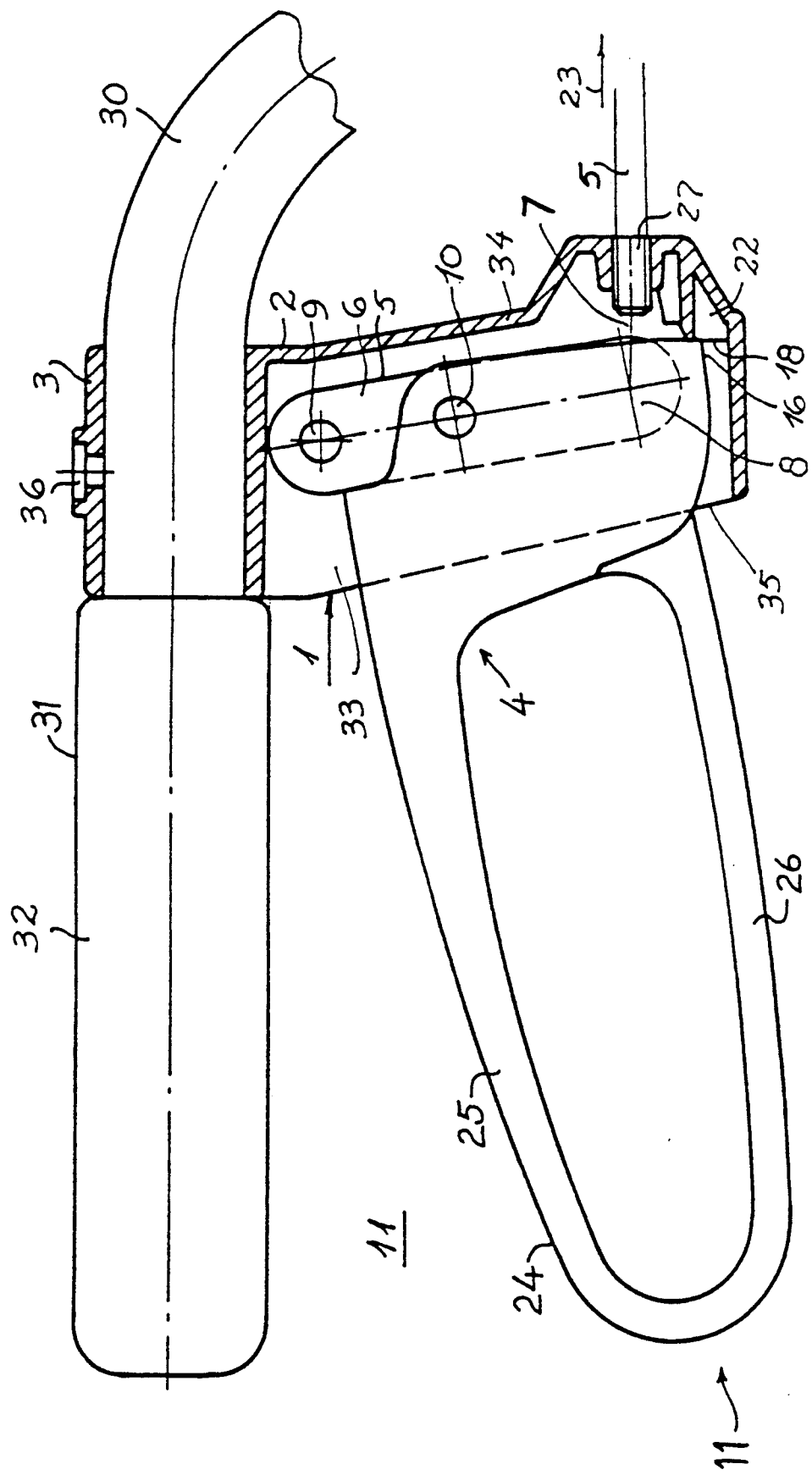
Figure 2:
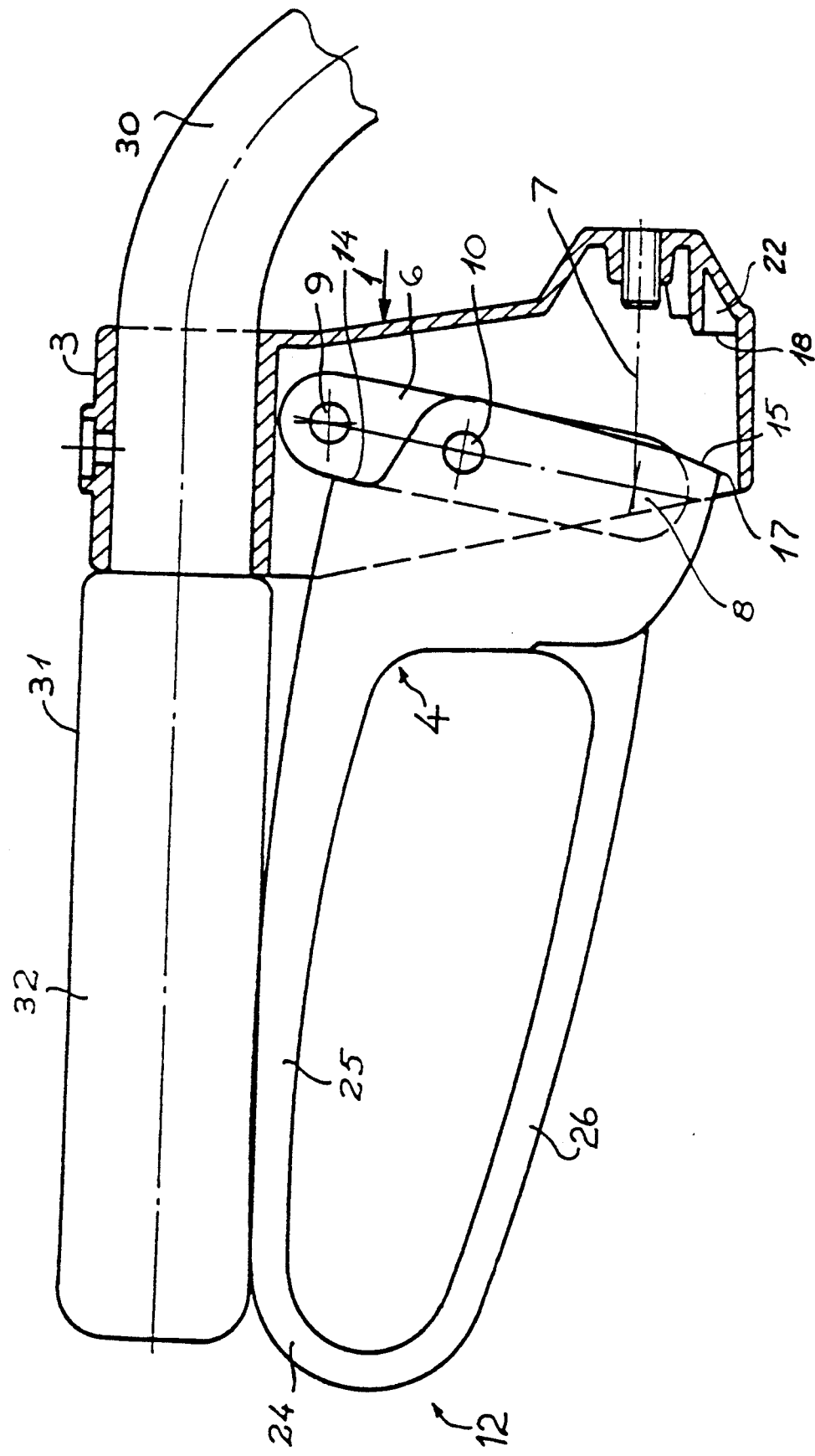

Reference numeral 1 in FIGS. 1-3 designates one embodiment of an apparatus according to the invention which, according to the embodiment, is disposed on a vehicle or an implement 30, for example a rolling walker, and on its handle or grip portion 31 in connection with a gripping handle 32. In such instance, the apparatus 1 is provided as a brake handle and is to impart a movement to a brake disposed on the implement for actuating the brake for braking the wheels of the implement. The brake may consist of a cable brake.

The apparatus 1 shown in illustrated embodiment includes a bracket 2 which is intended to carry the apparatus 1 and hold the apparatus 1 to an implement 30 or the like or to the substrate on which the apparatus is to be active and displays a mounting device 3 for mounting the apparatus 1 to the implement 30, the substrate or the like. The mounting device 3 may consist of a clamping member or other anchorage means or, according to the embodiment, a tube length of one piece construction with the bracket 2 which can be passed on a tubular portion and secured by means of fixing devices such as a screw through the hole 36 in the mounting device 3. The apparatus 1 further includes an operating device 4 which is to be actuated for operating the apparatus 1 and actuation of the brake, and a connecting device 5 between the operating device 4 and the brake for imparting to the brake and for actuation thereof the commands or operations controlled by the operating device. The connecting device 5 consists of an element 6 in the form of a link, and a coupling device 7 in the form of a cable, line, wire or the like which is disposed to extend between the apparatus 1 and the brake or its regulator. The coupling device 7 is, in the apparatus 1, connected and secured to a part 8 of the element 6 or in its one end portion. The element 6 is rotatably journalled in the apparatus 1 or the bracket 2 in pivot 9 by a shaft or the like which extends through the other end portion of the element 6 and is journalled in the bracket 2 or its side walls 33. The operating device 4 is rotatably journalled in the element 6 in a second pivot 10 by a shaft or the like. In front wall 34 of the bracket 2, there is a passage 27 for the coupling device 7. The opposing portion in the bracket 2 is open and forms an aperture 35 or an open side through which the operating device 4 can extend for convenient access.

With further reference to FIG. 4, there is shown the bracket 2 which is designed as a housing for protecting and partly covering the apparatus 1 and in whose side walls 33 there is a journal point 29 for the first pivot 9. The journal points 29 may consist of apertures or holes extending through the side walls 33, annular journal flanges or other journal types. In the bracket 2, there is further disposed a stop 22 which displays a first abutment 18 and a second abutment 20 between which extends a surface 19 or sliding surface for the operating device 4 and which may be designed as a convex surface, be curved, display planar portions with a curve, bend, radius or a preferably rounded edge 21. According to one embodiment of the apparatus 1 or the bracket 2, the stop 22 consists of an individual body which is disposable in the bracket 2 and which can be replaced by one or more other corresponding bodies with first and second abutments 18, 20, surface 19 or sliding surface and, where applicable, rounded edge 21, curve, bend or the like of a different extent, angle, positioning or the like and/or of a different dimension. Such a stop 22 is shown as one example in FIG. 6.

With further reference to FIG. 5, the operating device 4 is shown to display an arm or a lever which must be capable of being grasped. According to the illustrated embodiment, the operating device 4 is designed as a handle 24 in the form of a stirrup with a first arm 25 and a second arm 26, operation of the operating device 4 being thereby facilitated. The operating device 4 is thus disposed in or at the apparatus 1 by being anchored in a rotary connection with the element 6 in the second pivot 10 which is disposed to project out from the side surfaces of the element 6 and/or extend through the element 6. In turn, the element 6 is disposed in or at the apparatus 1 by, as mentioned, being anchored in a rotary connection between the bracket 2 or its side walls 33. Transfer of operations from the operating device 4 to the brake or its regulator is thus effected via the element 6 and the coupling device 7, i.e. via the connection arrangement 5 or 6 and 7.

The operating device 4 or the handle 24 is, according to the illustrated embodiment, disposed to be actuated by means of the fingers of one hand, which may grasp about the first arm 25 which is drawn towards the hand on braking when the apparatus is to assume a second position 12, see FIG. 2. When the apparatus is to assume a third position 13, see FIG. 3, the handle 24 is to be moved or actuated so as to move in the opposite direction, which may be effected in that the fingers are placed on the one side of the first arm 25 and the handle 24, or the first arm 25 is pressed in a direction away from the hand. In order to avoid relocation of the fingers and assuming a new grip, the operating device 4 or the handle 24 is, according to one embodiment, designed with a second arm 26, it being possible, on assuming said third position 13, to cause the fingers to press against the second arm 26 so that the handle 24 is rotated in a direction away from the hand.

The operating device 4 is further designed with a first abutment 14 or abutment surface disposed to be able to abut against the element 6 and an abutment portion 17, or in the form of an edge between a second and third abutment 15, respectively 16, abutment surfaces, defining edges or defining surfaces of the operating device 4, see FIG. 5.

In FIG. 1, the apparatus 1 is in a first position 11 or rest position which is a normal position and a disengaged position for the brake, i.e. the brake does not act upon the wheel for braking the wheel. The apparatus 1 is kept in this position by the loading or traction force with which the brake or a spring included in the brake regulator acts on the apparatus, as shown by the arrow 23. The operating device 4 abuts, in such instance, with its second abutment 15 against the first abutment 18 of the bracket 2 and with its first abutment 14 against the element 6. As a result of the said loading and the abutment of the operating device 4 against the first abutment 18 of the bracket 2 or the stop 22 and the abutment of the element 6 against the first abutment 14 of the operating device 4, the element 6 is kept in a starting position. In this first position 11 of the apparatus 1, the further movement of the operating device 4 and the element 6 in said loading direction 23 is thus restricted. In such instance, the operating device 4 and the element 6 can only be brought to movement or rotation by actuation on the handle 24 in that this is twisted in a direction towards the gripping handle 32 of the implement 30 or from the gripping handle 32.

In FIG. 2, the apparatus 1 is in a second position 12 or first operative position, which is a braking position or instantaneous braking position for the brake, i.e. the brake act on the wheel for braking effect on the wheel. The apparatus 1 is kept in this position in that the handle 24 is actuated so as to assume a rotated position in a direction towards the gripping handle 32 of the implement 30 or by a manual grip - or, more precisely, a grip with the fingers of the hand about the first arm 25 of the handle 24 and drawing of the operating device 4 in a direction towards the gripping handle 32 of the implement and, in such instance, overcoming the said loading on the apparatus 1. In that the operating device 4 is secured with the element 6 and the element 6 in its turn with the bracket 2 and abuts with its first abutment 14 against the element 6 in the first position 11 and during the rotation movement of the operating device 4, the operating device 4 and the element 6 will rotate together about the first pivot 9. The operating device 4 and the element 6 can, in this situation, be considered as a rigid body. The coupling device 7 is drawn in a direction towards the apparatus 1. When actuation of the operating device 4 ceases or the grip on the handle 24 is released, the apparatus 1 returns to the first position 11 and the operating device 4 and the element 6 to the starting position. The second abutment 15 and/or 17 of the operating device 4 will once again abut against the first abutment 18 of the stop 22.

In FIG. 3, the apparatus 1 is in a third position 13 or a second operative position which is also a braking position, but is here intended as a parking position for the brake, i.e. that the brake acts on the wheel for braking the wheel, this braking effect being maintained without continuous actuation or grip of the handle 24 being necessary. The apparatus 1 is moved from the first position 11 to the third position 13 in that the handle 24 is moved in a direction from the gripping handle 32 of the implement 30 by actuation preferably on the second arm 26. The abutment portion 17 or said edge of the operating device 4 is, in such instance, caused to slide towards and along the sliding surface 19 of the stop 22 while the said loading on the apparatus 1 is overcome and while the operating device 4 rotates about or in the second pivot 10 and the element 6 about or in the first pivot 9. The second pivot 10 will simultaneously move along an arcuate or circular line in a direction from the end wall 34 of the bracket 2 along an arcuate or circular line in a direction from the end wall 34 of the bracket 2 or towards the aperture 35, see the arrow 28, and, in such instance, at least until such time as the operating device 4 or its abutment portion 17 have passed, for example, that part located most proximal the second pivot 10 or the said rounded edge 21 or the like on the stop 22, the operating device 4 and its abutment portion 17 being moved along the sliding surface 19 of the stop 22 in a direction towards the second abutment 20 of the stop 22. The abutment portion 17 of the operating device 4 will abut against the second abutment 20 of the stop 22 and, according to one embodiment of the apparatus 1 of the present invention, be located in the transition between the sliding surface 19 of the stop 22 and the second abutment 20 of the stop 22. In such instance, the apparatus 1 will be located in the said third position 13. During the movement along the sliding surface 19 of the stop 22, the apparatus 1 or the operating device 4 has passed a dead point and is retained continuously in the third position 13 without any external actuation needing to be maintained on the operating device 4 or the handle 24. A continuous braking effect will now prevail on the wheel of the implement 30 as long as the operating device 4 or the apparatus 1 is located in this third position 13. A third abutment 16 or abutment surface can, in this instance, come to rest against the sliding surface 19 of the stop 22 in association with the second abutment 20 of the stop 22. When the apparatus 1 is to be released from the assumed third position 13, i.e. when it is desired to cancel the braking effect, the operating device 4 is caused, or by actuation or grip on its handle 24 or first arm 25, to rotate in a direction towards the gripping handle 32 of the implement 30 and at least until such time as the abutment portion 17 of the operating device 4 has passed the dead point during its sliding along the sliding surface 19 of the stop 22, whereafter the apparatus 1 or the operating device 4 once again assumes the first position 11.

Given that the apparatus 1 comprises the element 6 in the form of a relatively elongate body or link whose one end portion is rotatably journalled in the apparatus 1 or the bracket 2 and the connecting portion 8 is located in its other end portion, a long stroke length can be achieved in the coupling device 7 with relatively slight rotation of the operating device 4 or the handle which is journalled in the element 6 between these both said end portions or preferably closer to the centre of rotation of the first link 9 than the connection of the coupling device 7 in or at the element 6. Furthermore, less force is required than is normally the case in this type of apparatus for operating the handle 24, which is also because of the fulcrum principle which can be utilized and is utilized in the apparatus 1 as a result of the presence of the element 6, etc.

Without departing from the spirit and scope of the inventive concept as herein disclosed, modifications of the apparatus disclosed by way of the preferred embodiment are conceivable. Thus, the first abutment of the stop may consist of a planar surface which, via a more or less rounded edge or with an adapted radius, merges into the continuation or a second portion of the sliding surface to the second stop, which may consist of only a second portion of the sliding surface of the second stop which may consist of only an edge or surface in the stop of an extent deviating from the sliding surface or, for example, an extent approximately corresponding to the surface of the first stop or between approximately 75°-125° to the immediately proximal sliding surface. Furthermore, the mounting device of the bracket may be of different type and the handle of the operating device may display another design even if that illustrated and described is of advantageous design. In such instance, it might also be noted that the said first arm of the handle is of an extent which is located in the proximity of the centre of rotation of the first pivot or between the first pivot and the second pivot, i.e. at a relatively large distance from the connecting portion of the element to the coupling device. The apparatus according to the invention is thus not restricted to that which has been illustrated and described in connection with the embodiments, but only by the appended claims.

I claim:

1. Apparatus for actuating a brake of a wheeled vehicle comprising:
   a bracket with means for mounting said apparatus to said vehicle;
   an operating device having a handle for manually operating the apparatus;
   a connecting device comprising an elongated member, one end of which is pivotally mounted to said bracket, the second end of said elongated member being coupled to said brake to activate same;
   said operating device being pivotally mounted to said connecting device at a point intermediate the ends of said connecting device;
   said operating device having a first abutment adapted to contact the pivoted end of said connecting device and a second abutment which is adjacent the second end of said connecting device and adapted to contact a stop on said bracket;
   said operating device being manually movable between a first position in which said brake is not actuated and a second position in which said brake is actuated by manual pressure on said handle, and a third position in which said brake is maintained in the actuated position by the second abutment of said operating device resting on a portion of said stop means.

2. Apparatus as claimed in claim 1 in which said stop means comprises a first surface in which said second abutment of said operating device contacts when the apparatus is in the first position, and a second surface on which said second abutment rests to maintain the operating device in the third position.

3. Apparatus as claimed in claim 1 or 2 in which said handle comprises a stirrup through which the fingers of an operator may extend and having a first arm by which the operating device may be moved in one direction and a second arm by which the operating device may be moved in a second direction by the said fingers.

4. Apparatus as claimed in claims 1 or 2 in which said stop means is removably mounted in said bracket so that stop means of different shapes may be used.

* * * * *